Dec. 28, 1948.  A. BERTEA  2,457,339
WOBBLE PLATE PUMP
Filed Aug. 31, 1946

INVENTOR.
ALEX BERTEA
BY Harold W Mattingly
Attorney

Patented Dec. 28, 1948

2,457,339

UNITED STATES PATENT OFFICE 2,457,339

WOBBLE PLATE PUMP

Alex Bertea, Pasadena, Calif.

Application August 31, 1946, Serial No. 694,303

1 Claim. (Cl. 103—173)

My invention relates to pumps and more particularly to a wobble plate pump of compact design.

It is an object of my invention to produce a wobble plate pump that may be operated at high rotational speeds.

Another object of my invention is to provide a wobble plate pump with reliable but inexpensive valves.

Still another object of my invention is to provide a wobble plate pump having simplified valving and porting.

A further object of the invention is to provide a wobble plate pump with a simple seal against atmospheric pressure.

A still further object is to provide a wobble plate pump with an improved drive mechanism.

Figure 1:
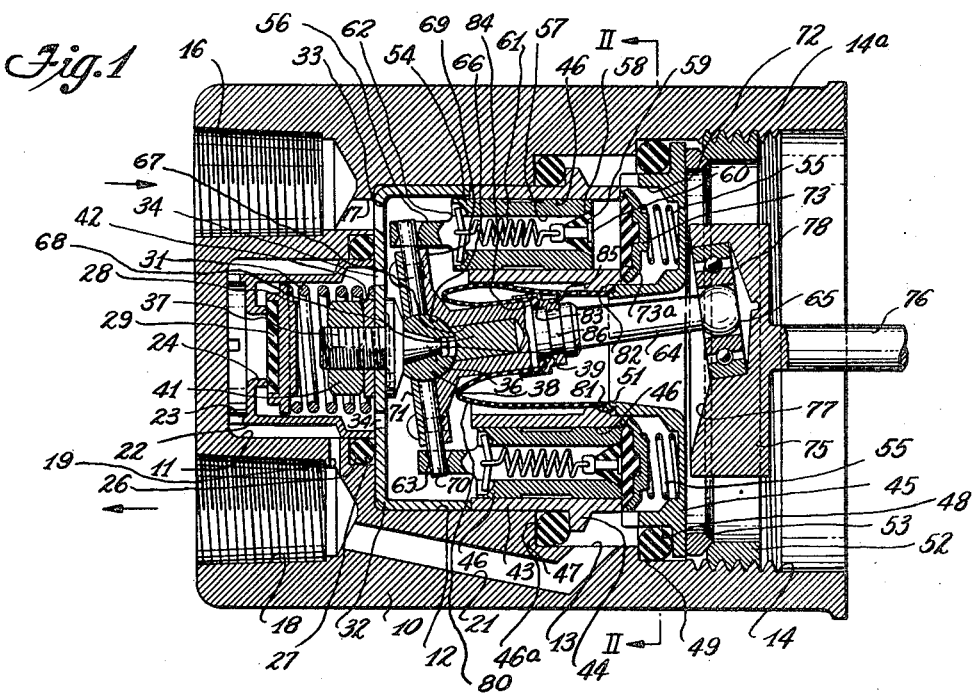
Figure 2:
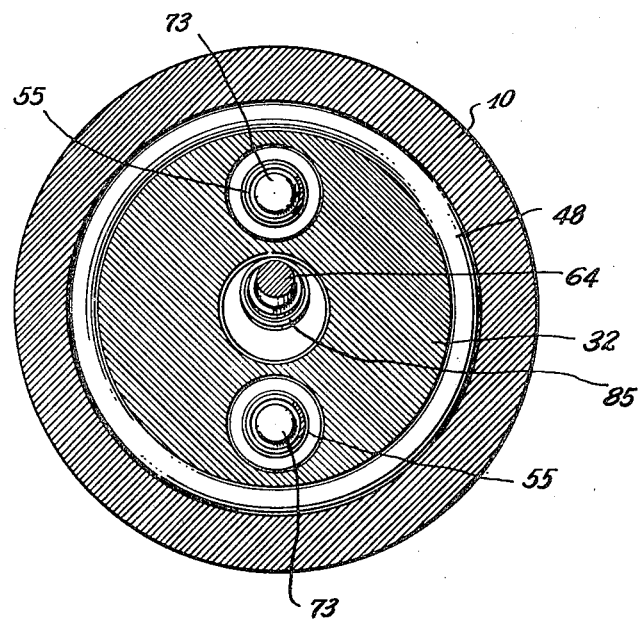

Other objects and advantages of my invention will be apparent in the following description and claim considered together with the accompanying drawings, in which:

Fig. 1 is an elevation view in full section of the pump showing the two pistons of the pump; and Fig. 2 is a sectional view taken along the line II—II of Fig. 1.

The pump has a housing 10 that may be cast or forged of any suitable metal such as aluminum and that has a plurality of concentric bores therein including a relief valve bore 11, a pump cavity or working bore 12, a high pressure bore 13 and an internally threaded bore 14. The housing also has an inlet port 16 communicating with the pump bore 12 by a passage 17. A pressure or output bore 18 is also formed in the body 10 and communicates with the relief bore 11 through a milled passage 19 and with the pressure bore 13 through a drilled passage 21.

Placed in the relief valve bore 11 is a relief valve cage 22 spaced from the bottom of the bore by a notched rim 23 that is integral with the cage. The cage 22 has stepped sides and an apertured bottom having inturned edges 24 forming a valve seat. An O-ring seal 26 is positioned in an annular shoulder 27 and seals the cage 22 in the bore 11. A valve cup 28 retains a valve pad 29 and the cup and pad are pressed on the seat 24 by a compression coil spring 31. When sufficient overload pressure builds up in the bottom of bore 11, it forces the relief valve 28—29 off of its seat 24, venting the overload pressure to inlet pressure.

Placed in the bottom of pump bore 12 is a shallow cup 32 having an aperture 33 aligned with the inlet passage 17 and having two apertures 34 communicating the interior of the relief valve cage 22 with the interior of the cup. Centrally disposed in the cup 32 is a conical pedestal 36 having a threaded shank 37 projecting through the cup 32. A ball 38 is secured to the pedestal by a nut 39. This ball forms a bearing for the wobble plate of the pump. The pedestal 36 is secured to the cup 32 by a nut 41 on the threaded shank 37 and is secured by a lock washer 42. The shallow cup also holds the relief cage 22 and its seal 26 in place as well as providing the compression for the relief spring 31.

Also placed in the pump bore 12 and resting on the cup member 32 is an annular body member 43 having an external flange 44 and two pump cylinders 46. An O-ring seal 46a is compressed by the external flange 44 on the body member 43 in a shoulder 47 formed by the junction of the bores 12 and 13. Placed over the end of the body member 43 is a flanged cap member 45 compressing an O-ring seal 48 against an annular shoulder 49, thus sealing off the high pressure portion of the pump in the pressure bore 13. An internal flange 51 of the cap member telescopes with the inner surface of the annular body member 43. An annular nut 52 engages the threads 14a and presses a stress-distributing ring 53 against the cap 45, thus holding the assembly together and in the housing 10.

Placed in each pump cylinder 46 is a piston 54 having a flatted projecting shank 56 and a central bore 57 cutting into the shank 56 and terminating in a conical portion 58 at its other end. A conical valve 59 made of rubber-like material rests against the conical surface 58 and is of such size that its outer surface is flush with the adjoining end of the piston 54. Thus the valve 59 also acts as a surface of the piston. A rivet 60 passing through each valve 59 is connected to one end of a tension spring 61, the other end of which is secured by a hook 62 spanning the bore 57. The shank 56 of each piston has a double tapered hole 63 therethrough.

The wobble plate unit of the pump includes a wobble stick 64 having a ball head 65 on its outer end and a ball socket 66 on its inner end. A bore 67 communicates with the ball socket 66 and is filled with oil soaked wicking 68 for lubricating the socket joint. The wobble plate is formed by an annular flange 69 on the inner end of the wobble stick 64. Riveted to the wobble plate 69 are two hardened steel rods 70 and an annular plate 71. The riveting operation is performed with the ball 38 (with its pedestal 36 attached) positioned in the socket 66. Since the inside diameter of the annular plate 71 is less than the diameter of the ball 38, a ball and socket joint is formed that cannot come apart in operation. After the riveting operation the ball and pedestal are secured to the shallow cup 32.

Positioned in valve cages 72 in the cap member 45 are compression springs 55 that hold a head valve cap 73 and its pad 73a against the ends of the cylinders 46. The head valve therefore seals off high pressure fluid from entering the pump cylinders 46. The head valves are lifted from their seats when the fluid being compressed by the piston 54 is of sufficient pressure to overcome the spring and the back pressure, and fluid is thus pumped from the intake 16 to the high pressure region of bore 13, from whence it may flow through the passage 21 to the outlet 18.

The intake portion of the pump is sealed from atmosphere by a flexible seal tube 80 having a head 81 on one end locked against an internal flange 82 on the annular body member 43 by the telescoping action of the cap flange 51. The other end of the seal tube is turned inside the rest of the tube and its head 83 is secured against a shoulder 84 on the wobble stick by a snap ring 85 positioned by a groove 86 in the wobble stick 64. The head 81 also serves as a seal between the cap 41 and the working annulus 54.

The wobble stick 64 is gyrated about the ball 38 by a driving wheel 75 mounted on a shaft 76 which may be secured to any suitable source of rotary power such as an electric motor. The left face 77 of the wheel 75 is finished at an angle that is normal to the axis of the wobble stick 64 at its desired angle of gyration. The face 77 is recessed to receive a ball bearing assembly 78 and the wobble stick head is positioned inside the inner annular race. This construction permits gyrating the wobble stick 64 without imparting any torsional forces thereto and without giving rise to any frictional forces at the wobble stick head.

The operation of the pump is as follows: The inlet port 16 and the outlet port 18 are connected to suitable conduits and the power source (not shown) is energized, rotating the shaft 76. The wheel 75 is thereby set in rotation and the acentric mounting of the ball bearing 78 causes the wobble stick 64 to gyrate on the ball 38. This gyration causes the wobble plate 67 to wobble from one extreme position to the other and back again for each cycle of gyration of the wobble stick 64. The rods 70 move with the wobble plate 69 and push and pull on the pistons 54.

When the pistons 54 are moved toward left, they are on the suction stroke. During the suction stroke the head valve pad 73a seals off the upper end of the cylinder 57 and the void that is created causes the piston valve 59 to move against the tension of the spring 61 and lift off of its conical seat 58. The fluid being pumped (either gaseous or liquid) flows from the inlet 16 through the aperture 33 into the left end of the piston 54 and fills the space between the right end of the piston and the head valve pad 73a. When the piston 54 is at the end of its suction stroke, the suction pressure is neutralized and the piston valve 59 closes. The pumping fluid is then trapped between the piston 54 and the head valve pad 73a.

Movement of the pistons toward the right gives rise to the pumping stroke and the trapped fluid is then compressed. When the spring pressure and back pressure are overcome, the head valve 73, 73a opens. The fluid then enters the cap 45 and the high pressure region of the bore 43. When the piston 54 reaches the end of its pumping stroke (lower piston of Fig. 1), the end of the piston and its valve are flush with the end of the cylinder 46. The head valve 73, 73a then closes, and the piston starts its suction stroke as previously described.

The high pressure fluid then passes about the bore 13 to the passage 21 and thence to the outlet port 18 for utilization in any desired fashion. The pump being a positive displacement pump, however, continues to supply high pressure fluid regardless of utilization of the fluid. If the fluid is not utilized sufficiently rapidly, an excessive back pressure may be developed that would injure the pump or the associated control valves. This pressure is transmitted through the passage 19 to the relief bore 11. When the pressure exceeds the compression of spring 31 and the exhaust back pressure, the relief valve 28—29 opens, venting the excessive pressure to inlet pressure.

The entire left portion of the pump, except for the relief portion 11, is open to inlet fluid to permit free access of this fluid to the pistons 54. Since this inlet pressure is usually less than atmospheric pressure, the atmospheric pressure forces the tubular bag 80 to the left as shown, pulling on its terminal heads to assume the desired position for free movement of the wobble stick 64. If the inlet pressure exceeds atmospheric, an appropriate conical spring may be provided having its smaller end secured to the wobble stick 64 and its larger end contact the fold of the tube 80.

It will be noted that the inlet valve not only acts as a part of the piston, but that its upper surface is flush with the end of the piston. This construction permits the elimination of volume at the end of the pumping stroke as indicated with the lower piston of Fig. 1. This renders the pump ideal for pumping gases in that all gas is expelled at the end of the pumping stroke, resulting in a stronger suction action on the subsequent suction stroke.

The pump housing 10 being machined with a series of concentric bores allows the principal machining operations to be performed with one setting of the housing. Further, the various chambers are simply formed by sealing off the various bores with donut or O-ring seals that are standard in the aircraft industry. These construction simplifications make possible the efficient manufacture of small pumps, and one manufactured embodiment has smaller dimensions than the drawing of this specification. The efficient driving mechanism eliminates frictional losses.

Although my invention has been described with reference to particular embodiments thereof, it is not limited to these embodiments nor otherwise, except by the terms of the following claim.

I claim:

In a wobble plate pump, a working cylinder, a head valve normally sealing one end of the cylinder, a tubular piston placed in the cylinder and having a valve seat formed on the end toward the head valve, an inlet valve positioned on the valve seat and so shaped with respect to the piston end and the head valve that no voids exist when the piston is at the extreme of its stroke toward the head valve, and wobble plate means for reciprocating the piston in the cylinder.

ALEX BERTEA.

REFERENCES CITED

The following references are of record in the file of this patent:

UNITED STATES PATENTS

| Number | Name | Date |
|---|---|---|
| 1,631,356 | Banning | June 7, 1927 |
| 1,715,735 | Banning | June 4, 1929 |
| 1,842,569 | Richer | Jan 26, 1932 |

FOREIGN PATENTS

| Number | Country | Date |
|---|---|---|
| 472,996 | France | 1914 |